US010899582B2

(12) United States Patent
Lin et al.

(10) Patent No.: US 10,899,582 B2
(45) Date of Patent: Jan. 26, 2021

(54) ELECTRIC MOTOR AND AN ELEVATOR SYSTEM

(71) Applicant: Otis Elevator Company, Farmington, CT (US)

(72) Inventors: Le Lin, Shanghai (CN); Dong Chen, Kunshan (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/656,970

(22) Filed: Oct. 18, 2019

(65) Prior Publication Data

US 2020/0122976 A1    Apr. 23, 2020

(30) Foreign Application Priority Data

Oct. 19, 2018   (CN) .......................... 2018 1 1221059

(51) Int. Cl.
| | |
|---|---|
| *H02K 7/10* | (2006.01) |
| *B66B 11/04* | (2006.01) |
| *B66B 1/36* | (2006.01) |
| *B66B 15/04* | (2006.01) |

(Continued)

(52) U.S. Cl.
CPC ............ *B66B 11/043* (2013.01); *B66B 1/365* (2013.01); *B66B 15/04* (2013.01); *H02K 7/088* (2013.01); *H02K 7/1025* (2013.01)

(58) Field of Classification Search
CPC ....... B66B 11/043; B66B 1/365; B66B 15/04; H02K 7/088; H02K 7/1025
See application file for complete search history.

(56) References Cited

U.S. PATENT DOCUMENTS

| | | | |
|---|---|---|---|
| 2,536,491 A | * | 1/1951 | Chapman ............. H02K 7/1028 310/77 |
| 2,735,029 A | | 4/1953 | Dyer et al. |
| 2,959,695 A | | 11/1960 | Huff |

(Continued)

FOREIGN PATENT DOCUMENTS

| | | |
|---|---|---|
| DE | 1088600 B | 9/1960 |
| GB | 1451165 A | 9/1976 |

(Continued)

OTHER PUBLICATIONS

European Search Report for application EP 19204186.1, dated Mar. 24, 2020, 25 pages.

*Primary Examiner* — Thanh Lam
(74) *Attorney, Agent, or Firm* — Cantor Colburn LLP

(57) ABSTRACT

An electric motor and an elevator system. The electric motor includes: a casing; a stator supported by the casing, the stator including a stator yoke and stator teeth, and a winding being wound around the stator teeth and generating a magnetic field when energized; and a rotor which rotates under the action of the magnetic field; wherein at least a portion of the stator yoke is formed as a moving plate which is movable between a first position and a second position; and when the winding is energized, the moving plate is capable of moving from the first position to the second position under the action of the magnetic field, and in the second position, the moving plate is separated from the rotor; and after the winding is de-energized, the moving plate is moved from the second position to the first position under the action of a spring force.

20 Claims, 7 Drawing Sheets

(51) Int. Cl.
  *H02K 7/08* (2006.01)
  *H02K 7/102* (2006.01)

(56) References Cited

U.S. PATENT DOCUMENTS

| | | | |
|---|---|---|---|
| 3,683,217 A * | 8/1972 | Agalakov | H02K 7/1028 |
| | | | 310/77 |
| 5,982,063 A | 11/1999 | Lutz et al. | |
| 6,326,710 B1 | 12/2001 | Guenther et al. | |
| 6,455,975 B1 | 9/2002 | Raad et al. | |
| 6,707,192 B2 | 3/2004 | Herzog | |
| 6,731,034 B1 | 5/2004 | Habele et al. | |
| 7,108,110 B2 | 9/2006 | Habele | |
| 7,732,961 B2 | 6/2010 | Lin | |
| 8,058,757 B2 | 11/2011 | Himmelmann | |
| 8,618,704 B2 | 12/2013 | Hiller et al. | |
| 2014/0060980 A1* | 3/2014 | Piech | H02K 7/106 |
| | | | 188/67 |
| 2014/0197717 A1 | 7/2014 | Busch | |
| 2015/0329318 A1* | 11/2015 | Cambruzzi | B66D 5/30 |
| | | | 188/164 |
| 2020/0266682 A1* | 8/2020 | Goossens | H02K 7/125 |

FOREIGN PATENT DOCUMENTS

| | | |
|---|---|---|
| JP | S49135110 A | 11/1974 |
| JP | S5713943 A | 1/1982 |
| JP | 2000050569 A | 2/2000 |
| JP | 2012197925 A | 10/2012 |

* cited by examiner

ELECTRIC MOTOR AND AN ELEVATOR SYSTEM

FOREIGN PRIORITY

This application claims priority to Chinese Patent Application No. 201811221059.8, filed Oct. 19, 2018, and all the benefits accruing therefrom under 35 U.S.C. § 119, the contents of which in its entirety are herein incorporated by reference.

FIELD OF THE INVENTION

The present disclosure relates to the field of electric motors, and in particularly to an electric motor with a braking function, and an elevator system to which such an electric motor is applied.

BACKGROUND OF THE INVENTION

Common electric motors such as a drive motor for an elevator typically uses independent brake devices. The drive motor for elevator shown in FIG. 1 includes a motor body 11, a sheave, and brake devices 12, 13 on both sides of the motor body 11. The brake devices 12, 13 are for example brake systems based on electromagnetic control. For example, the brake devices 12, 13 are attracted by an electromagnetic force and thus separated from a rotor of the electric motor. When the electromagnetic force is canceled, a spring device acts on a brake disc of the brake device so that the brake disc interferes with the rotor of the electric motor to provide a braking force, thereby stopping the rotation of the rotor of the electric motor.

SUMMARY OF THE INVENTION

An object of the present disclosure is to solve or at least alleviate the problems in the related art.

According to some aspects, an electric motor is provided, which includes: a casing; a stator supported by the casing, the stator including a stator yoke and stator teeth, and a winding being wound around the stator teeth and generating a magnetic field when energized; and a rotor which rotates under the action of the magnetic field; wherein at least a portion of the stator yoke is formed as a moving plate which is movable between a first position and a second position; wherein when the winding is energized, the moving plate is capable of moving from the first position to the second position under the action of the magnetic field, and wherein in the second position, the moving plate is separated from the rotor; and wherein after the winding is de-energized, the moving plate is moved from the second position to the first position under the action of a spring force generated by the moving plate itself or by a spring member, so that the moving plate comes into contact with the rotor to provide a braking force to the rotor.

Optionally, in the electric motor, the moving plate moves between the first position and the second position in a radial direction.

Optionally, in the electric motor, the moving plate is connected to a leaf spring fixedly connected to the casing via positioning pins at both ends thereof, and the spring force is provided by the leaf spring.

Optionally, in the electric motor, the moving plate is connected to a portion of the stator teeth through a spring, wherein the portion of the stator teeth is fixedly connected to the casing, and the spring force is provided by the spring.

Optionally, in the electric motor, the moving plate has a slit, and when the moving plate is in the second position, it is compressed by the adjacent stator yoke and is elastic deformed to generate a spring force, which drives the moving plate to move toward the first position.

Optionally, in the electric motor, at least one friction plate is arranged on a surface of the moving plate that is in contact with the rotor.

Optionally, in the electric motor, the moving plate is formed by stacking a plurality of sheets.

Optionally, in the electric motor, the stator yoke is formed by a plurality of moving plates circumferentially arranged, and the stator yoke is completely separated from the stator teeth which are fixed to the casing.

Optionally, in the electric motor, the rotor includes an inner ring disposed on an inner side of the stator, an outer ring disposed on an outer side of the stator, and a connection portion connected between the inner ring and the outer ring.

Optionally, in the electric motor, the casing includes a support shaft portion, to which the rotor is rotatable mounted via a bearing.

Optionally, in the electric motor, one of the inner ring and the outer ring of the rotor acts as a brake drum for contact with the moving plate, and the other is provided with a permanent magnet thereon.

In another aspect, an elevator system is provided, which includes a sheave; and an electric motor according to various embodiments of the present disclosure, which is configured to drive the sheave to rotate.

Based on the electric motor according to the embodiments of the present disclosure, an electric motor integrated with a braking device is provided, which simplifies the structure of the electric motor.

BRIEF DESCRIPTION OF THE DRAWINGS

The present disclosure will become more easily understood with reference to the drawings. Those skilled in the art will readily appreciate that the drawings are for illustrative purposes only, and are not intended to limit the scope of protection of the present disclosure. In addition, similar parts are denoted by similar numbers in the drawings, in which.

DETAILED DESCRIPTION OF THE EMBODIMENT(S) OF THE INVENTION

Figure 1:
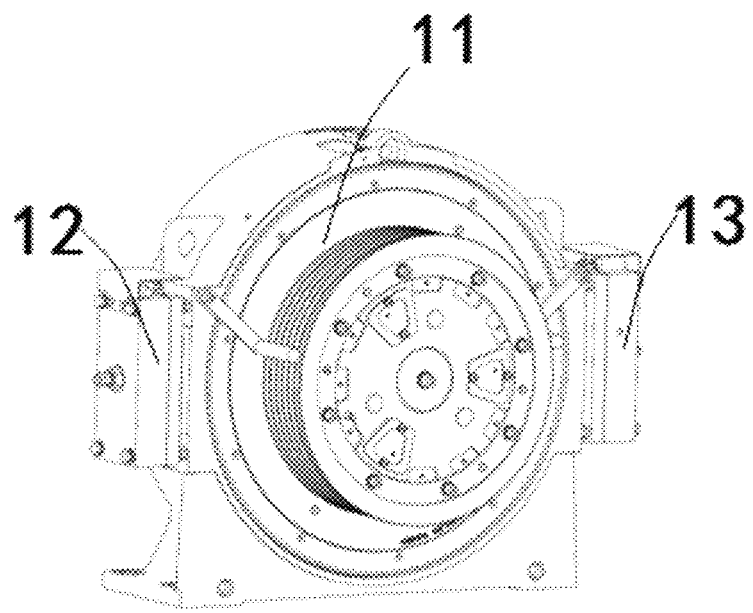
FIG. 1 shows a common elevator drive device.
Figure 2:
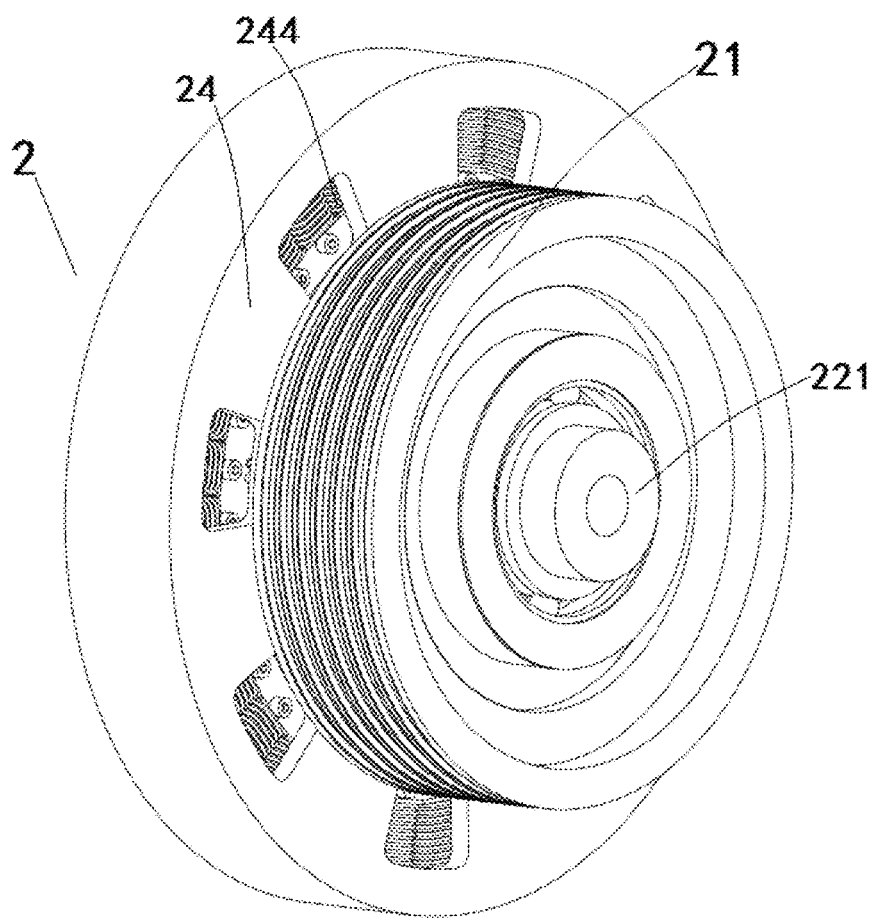
FIG. 2 shows a perspective view of an elevator drive device in accordance with an embodiment of the present disclosure.

It will be readily understood that, based on the technical solutions of the present disclosure, those skilled in the art can propose various alternative embodiments and implementations without departing from the true spirit of the present disclosure. Therefore, the following detailed description and the accompanying drawings are merely exemplary description of the technical solutions of the present disclosure, which shall not be deemed as the whole of the present disclosure or as limiting or restricting the technical solutions of the present disclosure.

Such orientation terms as upper, lower, left, right, front, rear, front side, back side, top, bottom or the like that are mentioned or may be mentioned in this description are defined with respect to the configurations shown in the individual drawings. They are relative concepts and thus possibly vary according to their different locations and different usage states. Therefore, these or other orientation terms shall not be interpreted as limiting terms.

Reference is made to FIGS. 2 to 7, which show views of an elevator drive device 2 and components thereof in accordance with an embodiment of the present disclosure respectively. The elevator drive device 2 is mainly composed of an electric motor and a sheave 21, and the electric motor is integrated with a brake device. The sheave 21 may be provided with a rope groove 211 for winding a rope. The sheave 21 is connected with a rotor 24 of the electric motor to rotate with the rotor 24, and the rotation of the sheave 21 drives the rope to move, thereby causing an elevator car to ascend or descend. The electric motor according to the embodiment of the present disclosure includes: a casing 22; a stator supported by the casing 22, the stator including a stator yoke 300 and stator teeth 261, and a winding 28 being wound around the stator teeth 261 and generating a magnetic field when energized; and a rotor 24, which rotates under the action of the magnetic field generated by the winding, wherein at least a portion of the stator yoke 300 acts as a moving plate to provide a braking force to the rotor 24 of the electric motor when the winding is de-energized.

Figure 3:
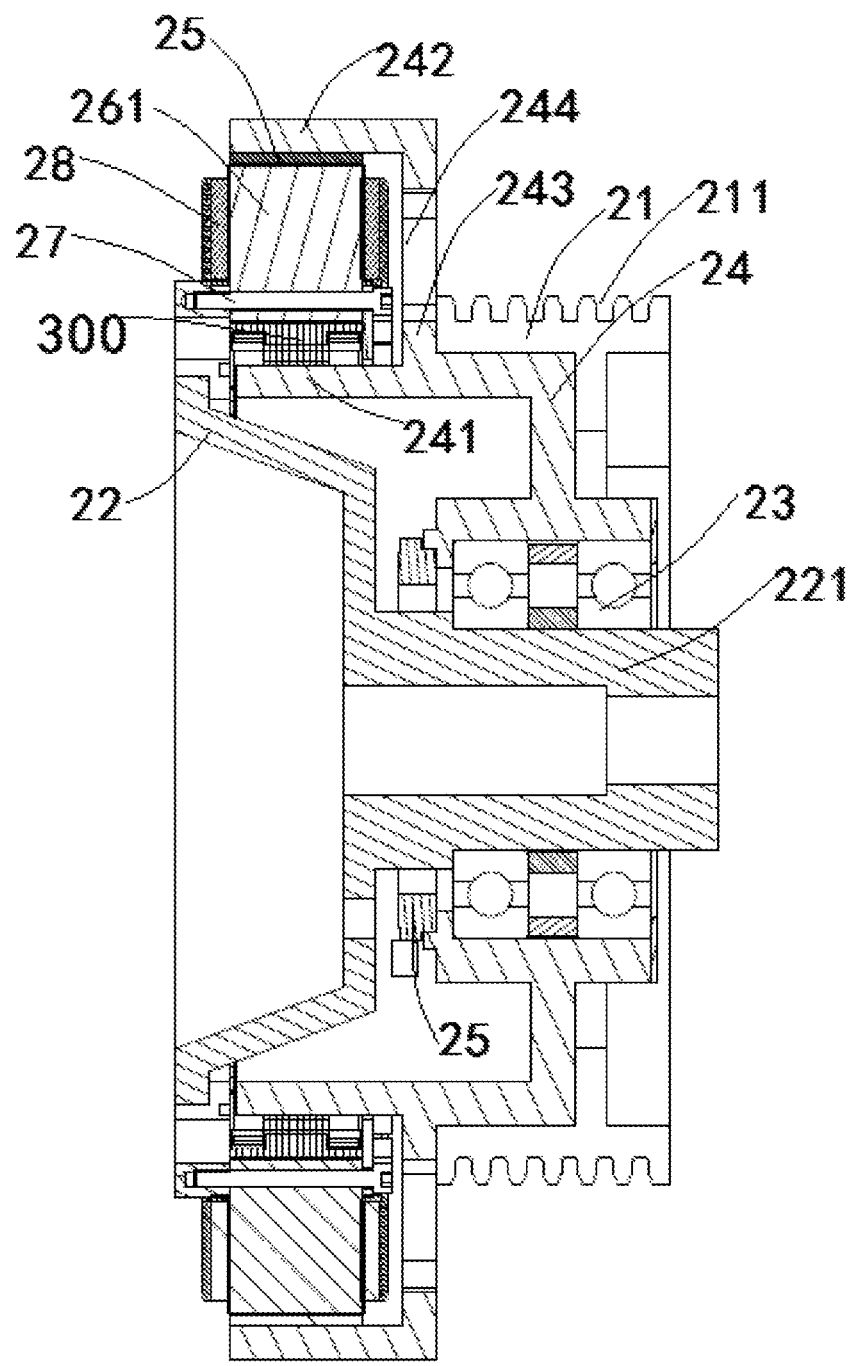
FIG. 3 is a longitudinal sectional view of the elevator drive device of FIG. 2.

In some embodiments, as shown more clearly in the cross-sectional view of FIG. 3, the rotor 24 includes an inner ring 241 disposed on an inner side of the stator, an outer ring 242 disposed on an outer side of the stator, and a connection portion 243 connected between the inner ring 241 and the outer ring 242. By arranging the rotor to include the inner ring 241 and the outer ring 242, one of the inner ring 241 and the outer ring 242 may serve as a brake drum for contact with the moving plate of the stator yoke, and the other may be provided with a permanent magnet thereon, thus avoiding contact between the permanent magnet and the moving plate and preventing the permanent magnet from be demagnetized due to heat during braking. In the illustrated embodiment, the inner ring 241 of the rotor acts as a brake drum, and a permanent magnet 25 is disposed on an inner side of the outer ring 242 of the rotor. The permanent magnet 25 drives the rotor 24 to rotate under the action of the magnetic field of the winding 28. In an alternative embodiment, the stator yoke may be disposed as an outer ring of the stator teeth, while the outer ring of the rotor may serve as a brake drum, and the inner ring of the rotor may be provided with a permanent magnet. In addition, the structure according to an embodiment of the present disclosure is also applicable to internal-rotor-type electric motors or external-rotor-type electric motors. In some embodiments, the connection portion 243 may be provided with a vent 244 for heat dissipation of the winding. In some embodiments, the casing 22 includes a support shaft portion 221 to which the rotor 24 is rotatably mounted via a bearing 23. In some embodiments, an encoder 25 for the electric motor is also disposed on the support shaft portion 221.

Figure 4:
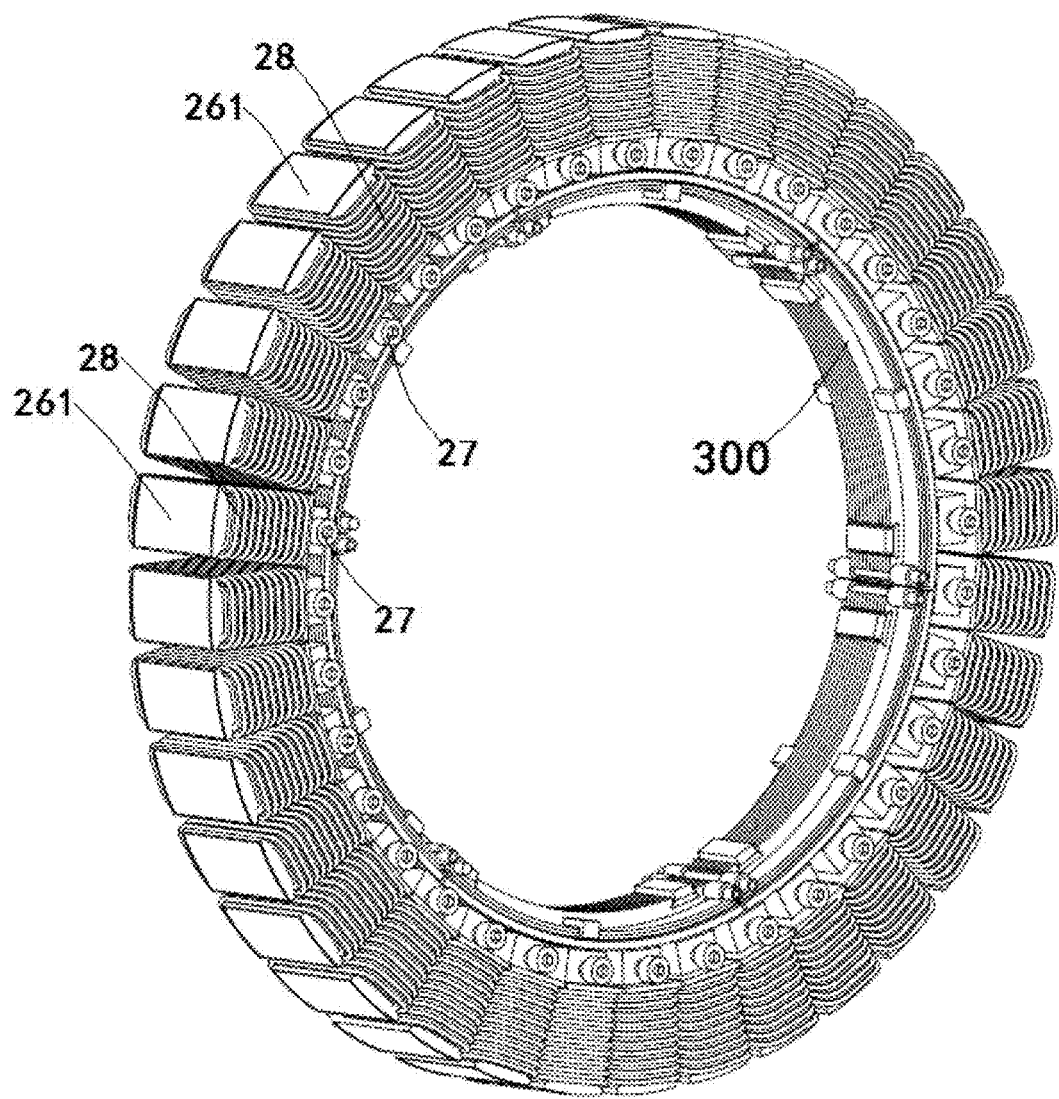
FIG. 4 is a perspective view showing a stator and a winding in the electric motor of FIG. 2.
Figure 5:
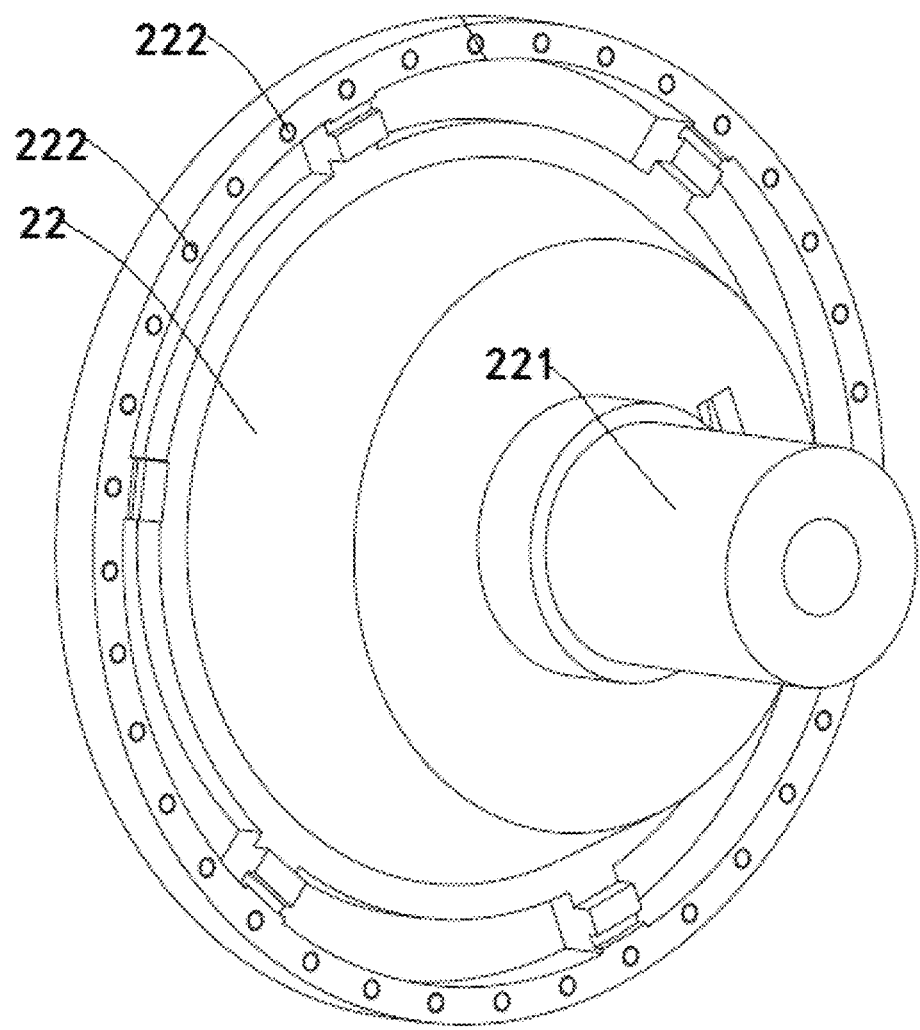
FIG. 5 is a perspective view showing a casing in the electric motor of FIG. 2.

With continued reference to FIG. 3, in some embodiments, the stator may be supported by the casing 22. For example, the stator teeth 28 may be fixed to a back plate of the casing 22 via bolts 27, and the stator yoke 300 may also be fixed on the back plate of the casing 22. In an alternative embodiment, the stator yoke 300 may be connected to the stator teeth. Referring to FIG. 4, in this embodiment, the stator yoke 300 is entirely composed of a plurality of moving plates circumferentially arranged. In an alternative embodiment, the stator yoke 300 may include a fixed portion and a moving plate. Although not shown, the stator yoke 300 and the stator teeth 28 may be completely separated, and the stator teeth 28 are fixed to the casing 22 via the bolts 27, i.e., fixed into openings 222 around the casing 22. By completely separating the stator teeth from the stator yoke, the main magnetic flux can be utilized to the maximum.

Figure 6:
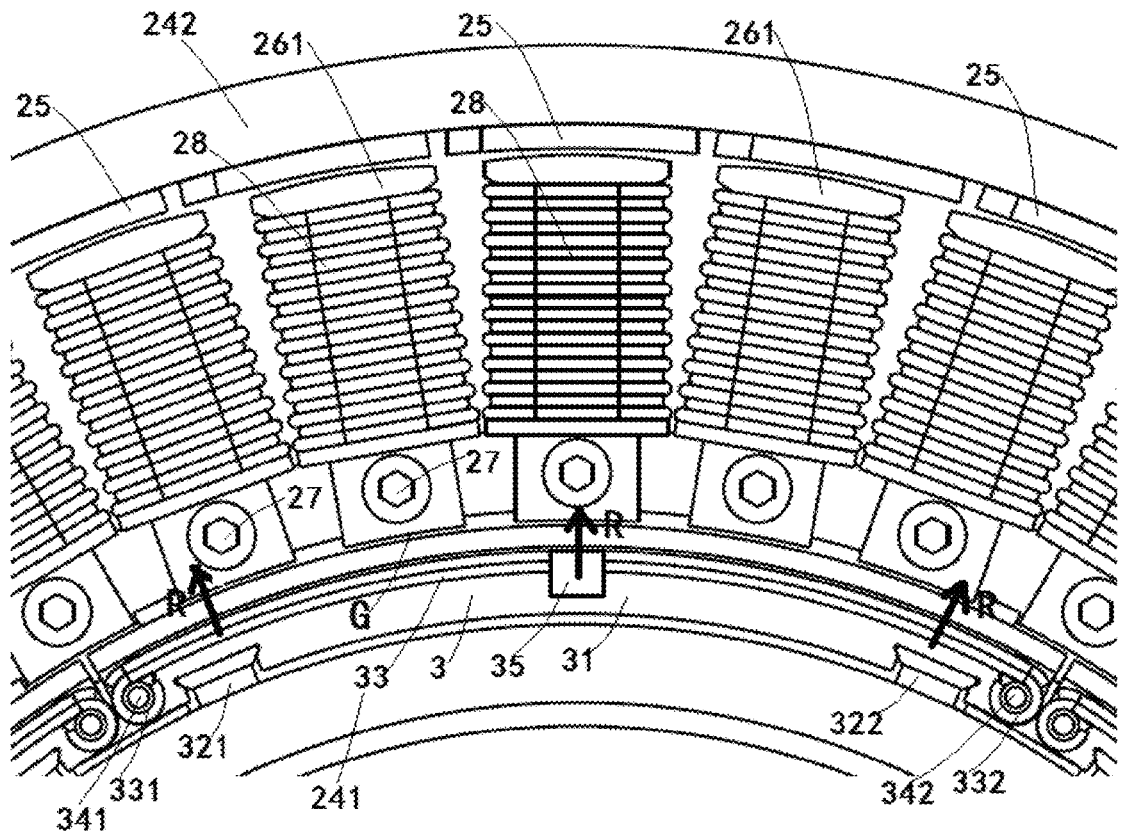
FIG. 6 shows a partial cross-sectional view of the electric motor of FIG. 2.
Figure 7:
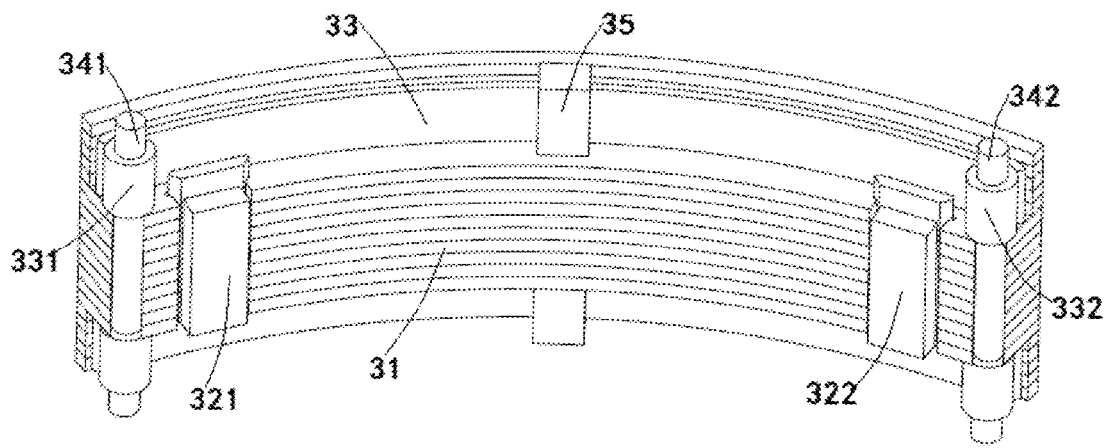
FIG. 7 is a perspective view showing a moving plate and a leaf spring in the electric motor of FIG. 2.

With continued reference to FIGS. 6 and 7, the moving plate 3 includes a moving plate body 31 which may be formed into a circular arc shape to accommodate the overall cylindrical shape of the stator yoke 300. The moving plate body 31 is fixed to a leaf spring 33, and both ends 331, 332 of the leaf spring 33 are connected to positioning pins 341, 342, respectively. The positioning pins 341, 342 are fixedly connected to the casing 22. In some embodiments, the inner side of the moving plate 3 is further provided with friction plates 321, 322 which provide a friction force when coming into contact with the rotor. In some embodiments, a limiting block 35 may also be disposed on the leaf spring 33 to facilitate mounting thereof and to serve as a guiding stopper when the moving plate 3 moves. The moving plate 3 is movable between a first position and a second position. As shown in FIG. 6, at this point, the winding 28 of the electric motor is not energized, and the moving plate 3 is in the first position. When the electric motor needs to be operated, the winding 28 is energized, and the magnetic field generated by the winding 28 acts on the moving plate 3. Specifically, the moving plate 3 is attracted so that it moves radially outward substantially in a direction indicated by the arrow R. During the movement, an attractive force generated by the magnetic field of the winding 28 overcomes a spring force generated by the deformation of the leaf spring 33. As shown in the figures, since there is a gap G between the moving plate 3 and the stator teeth 261, when the moving plate 3 moves radially outward until it abuts against the stator teeth 261 and occupies the gap G, the moving plate 3 reaches the second position. In the second position, the friction plates 321, 322 of the moving plate are separated from the inner ring 241 of the rotor such that the rotor 24 can be rotated under the action of the magnetic field generated by the winding 28. Specifically, the permanent magnet 25 on the outer ring 242 of the rotor rotates the rotor 24 under the action of the magnetic field of the winding 28. When it is needed to stop the electric motor, the winding 28 is de-energized, and the moving plate is again moved radially inward from the second position by the spring force of the leaf spring 33 to the first position as shown in FIG. 6. At this point, the moving plate 3 comes into contact with the rotor 24. Specifically, the friction plates 321, 322 of the moving plate 3 come into contact with the inner ring 241 of the rotor 24 to provide a braking force to the rotor 24, so that the rotor 24 can be quickly stopped. As shown in FIG. 7, in some embodiments, similar to the conventional stator yoke structure, the moving plate 3 is formed by stacking a plurality of sheets which may be made of a soft magnetic material to shorten the de-energized braking response time. The control of the electric motor according to the present disclosure is more convenient. After the energization, the moving plate automatically releases the rotor to enable a rotation of the rotor. After the de-energization, the moving plate automatically locks the rotor and stops the rotor quickly. For the overall control of the electric motor, it is only required to control a current of the electric motor. There is no need for an additional control system for the braking device, thus simplifying the electric motor structure and control flow.

Figure 8:
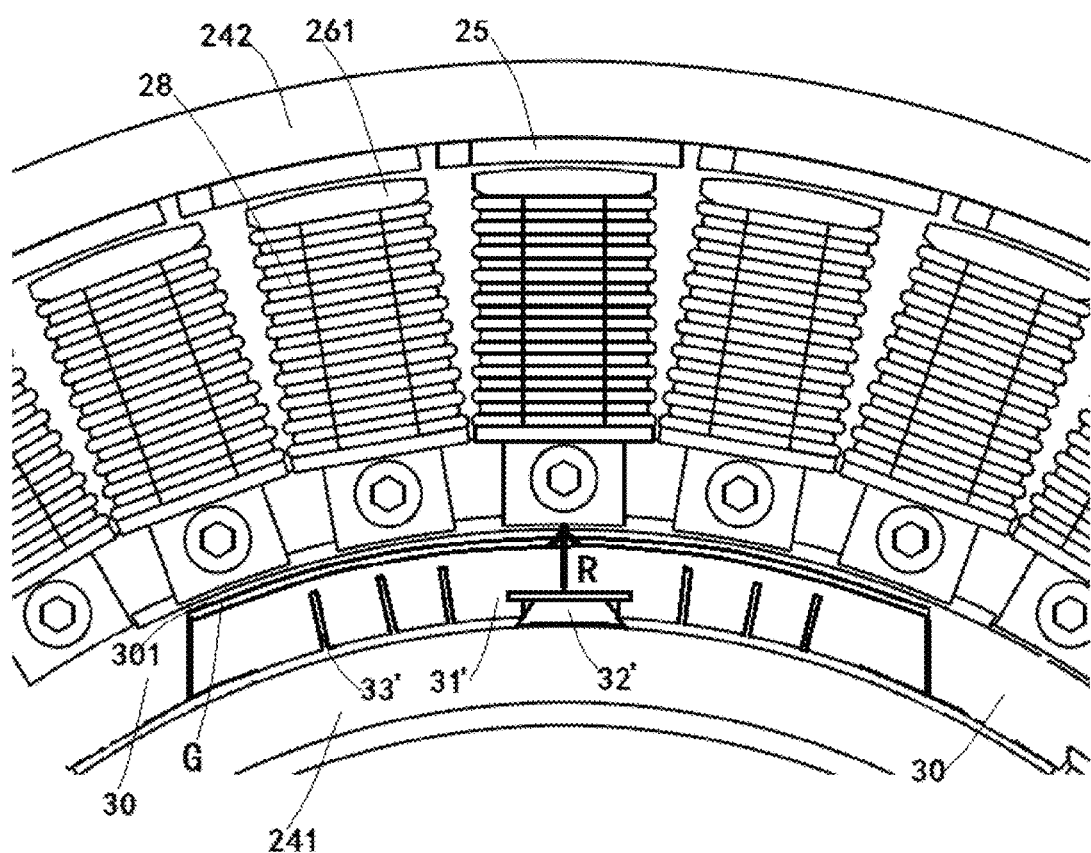
FIG. 8 shows a partial cross-sectional view of a variation of the electric motor of FIG. 2.

FIG. 8 illustrates another embodiment in accordance with the present disclosure. In this embodiment, the stator yoke includes fixed portions 30 and a moving plate 31', and the fixed portions 30 of the stator yoke may be connected via a support layer 301. The stator teeth 261 may be connected to the stator yoke or to the casing via bolts. The moving plate 31' may have slits 33' which may extend, for example, in a radial direction. The moving plate 31' may further include a friction plate 32' disposed on an inner side thereof. Similarly, the moving plate 31' is movable between a first position and a second position. As shown in FIG. 8, at this point, the winding 28 of the electric motor is not energized, and the moving plate 31' is in the first position. When it is desired to operate the electric motor, the winding 28 is energized, and the magnetic field generated by the winding 28 acts on the moving plate 31'. Specifically, the moving plate 31' is attracted so that the moving plate 31' is moved radially outward substantially in a direction indicated by the arrow R. During the movement, the attractive force generated by the magnetic field of the winding 28 overcomes the spring force generated due to a compression deformation of the moving plate 31' caused by the fixed portions 30 of the stator yoke on both sides. As shown in the figure, since there is a gap G between the moving plate 31' and the support layer 301, when the moving plate 3 moves radially outward until it abuts against the support layer 301 and occupies the gap G, the moving plate 3 reaches the second position. In the second position, the friction plate 32' of the moving plate is separated from the inner ring 241 of the rotor such that the rotor 24 can be rotated under the action of the magnetic field generated by the winding 28. When it is desired to stop the electric motor, the winding 28 is de-energized, and the moving plate 31' is again moved radially inward from the second position by the spring force generated by compression thereof to the first position as shown in FIG. 8. At this point, the moving plate 31' comes into contact with the rotor 24. Specifically, the friction plate 32' of the moving plate 31' comes into contact with the inner ring 241 of the rotor 24 to provide a braking force to the rotor 24, so that the rotor 24 can be quickly stopped. In some embodiments, similar to a conventional stator yoke structure, the moving plate 31' may be formed by stacking a plurality of sheets which may be made of a soft magnetic material to shorten the de-energized braking response time.

Figure 9:
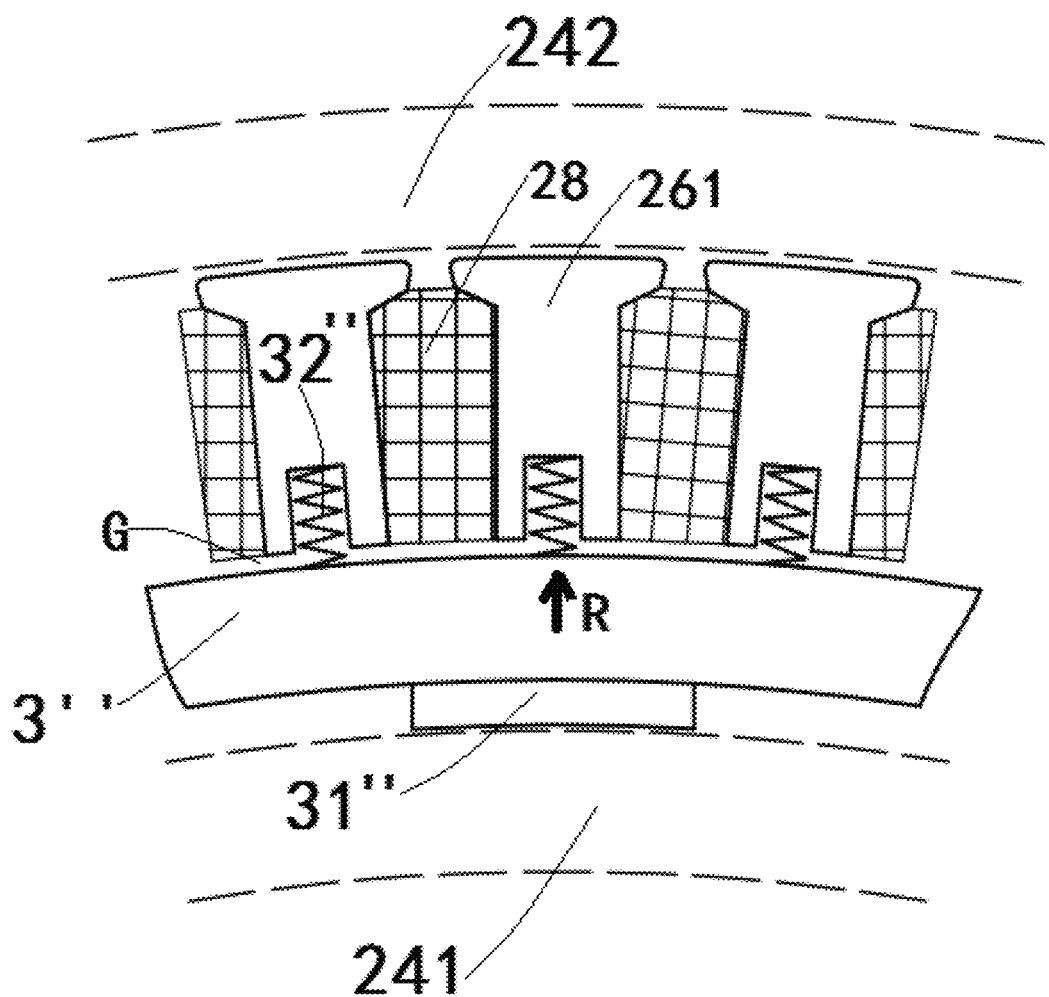
FIG. 9 shows a partial cross-sectional view of another variation of the electric motor of FIG. 2.

FIG. 9 shows a schematic view in accordance with another embodiment of the present disclosure. In this embodiment, the stator yoke includes a fixed portion (not shown) and a moving plate 3". The moving plate 3" may be connected to the stator teeth 261 by a spring 32", and the stator teeth 261 are in turn connected to the casing. The moving plate 3" may also include a friction plate 31" disposed on an inner side thereof. Similarly, the moving plate 3" is movable between a first position and a second position. As shown in FIG. 9, at this point, the winding 28 of the electric motor is not energized, and the moving plate 3" is in the first position. When the winding 28 is energized, the magnetic field generated by the winding 28 acts on the moving plate 3". Specifically, the moving plate 3" is attracted so that the moving plate 31" moves radially outward substantially in a direction indicated by the arrow R. During the movement, the attractive force generated by the magnetic field of the winding 28 overcomes a spring force generated by compression of the spring 32". As shown in the figure, since there is a gap G between the moving plate 3" and the stator teeth 261, when the moving plate 3 moves radially outward to abut against the stator teeth 261 and occupy the gap G, the moving plate 3 reaches the second position. In the second position, the friction plate 31" of the moving plate is separated from the inner ring 241 of the rotor so that the rotor 24 can be rotated under the action of the magnetic field generated by the winding 28. When the winding 28 is de-energized, the moving plate 3" is again moved radially inward from the second position by the spring force of the spring 32" to the first position as shown in FIG. 9. At this point, the moving plate 3" comes into contact with the rotor 24. Specifically, the friction plate 31" of the moving plate 3" comes into contact with the inner ring 241 of the rotor 24 to provide a braking force to the rotor 24 so that the rotor 24 can be quickly stopped. In some embodiments, similar to a conventional stator yoke structure, the moving plate 3" may be formed by stacking a plurality of sheets which may be made of a soft magnetic material to shorten the de-energized braking response time.

In another aspect, an elevator system is provided, which includes a sheave; and an electric motor in accordance with the embodiments of the present disclosure, which is configured to drive the sheave to rotate.

Based on the electric motor according to the embodiments of the present disclosure, an electric motor integrated with a braking device is provided, thus eliminating the need for separate braking device and control system, simplifying the electric motor structure, and reducing power consumption, weight, volume, cost and the like of the electric motor.

The specific embodiments described above are merely for describing the principle of the present disclosure more clearly, and various components are clearly illustrated or depicted to make it easier to understand the principle of the present disclosure. Those skilled in the art can readily make various modifications or changes to the present disclosure without departing from the scope of the present disclosure. It should be understood that these modifications or changes should be included within the scope of protection of the present disclosure.

What is claimed is:
1. An electric motor, comprising:
   a casing;
   a stator supported by the casing, the stator comprising a stator yoke and stator teeth, and a winding being wound around the stator teeth and generating a magnetic field when energized; and
   a rotor which rotates under the action of the magnetic field;
   characterized in that at least a portion of the stator yoke is formed as a moving plate which is movable between a first position and a second position;
   wherein when the winding is energized, the moving plate is capable of moving from the first position to the second position under the action of the magnetic field, and wherein in the second position, the moving plate is separated from the rotor; and
   wherein after the winding is de-energized, the moving plate is moved from the second position to the first position under the action of a spring force generated by the moving plate itself or by a spring member, so that the moving plate comes into contact with the rotor to provide a braking force to the rotor.

2. The electric motor according to claim 1, wherein the moving plate moves between the first position and the second position in a radial direction.

3. The electric motor according to claim 2, wherein the moving plate is connected to a leaf spring which is fixedly connected to the casing via positioning pins, and the spring force is provided by the leaf spring.

4. The electric motor according to claim 2, wherein the moving plate is connected to a portion of the stator teeth through a spring, and wherein the portion of the stator teeth is fixedly connected to the casing, and the spring force is provided by the spring.

5. The electric motor according to claim 2, wherein the moving plate has a slit, and when the moving plate is in the second position, it is compressed by the adjacent stator yoke and is elastic deformed to generate a spring force, which drives the moving plate to move toward the first position.

6. The electric motor according to claim 2, wherein at least one friction plate is arranged on a surface of the moving plate that is in contact with the rotor.

7. The electric motor according to claim 1, wherein the moving plate is formed by stacking a plurality of soft magnetic sheets.

8. The electric motor according to claim 1, wherein the stator yoke is formed by a plurality of moving plates circumferentially arranged, and the stator yoke is completely separated from the stator teeth which are fixed to the casing.

9. The electric motor according to claim 1, wherein the rotor comprises an inner ring disposed on an inner side of the stator, an outer ring disposed on an outer side of the stator, and a connection portion connected between the inner ring and the outer ring.

10. The electric motor according to claim 9, wherein the casing comprises a support shaft portion, to which the rotor is rotatable mounted via a bearing.

11. The electric motor according to claim 9, wherein one of the inner ring and the outer ring of the rotor acts as a brake drum for contact with the moving plate, and the other is provided with a permanent magnet thereon.

12. An elevator system, comprising:
a sheave; and
an electric motor configured to drive the sheave to rotate and comprising:
a casing;
a stator supported by the casing, the stator comprising a stator yoke and stator teeth, and a winding being wound around the stator teeth and generating a magnetic field when energized; and
a rotor which rotates under the action of the magnetic field;
characterized in that at least a portion of the stator yoke is formed as a moving plate which is movable between a first position and a second position;
wherein when the winding is energized, the moving plate is capable of moving from the first position to the second position under the action of the magnetic field, and wherein in the second position, the moving plate is separated from the rotor; and
wherein after the winding is de-energized, the moving plate is moved from the second position to the first position under the action of a spring force generated by the moving plate itself or by a spring member, so that the moving plate comes into contact with the rotor to provide a braking force to the rotor.

13. The elevator system according to claim 12, wherein the moving plate moves between the first position and the second position in a radial direction.

14. The elevator system according to claim 13, wherein the moving plate is connected to a leaf spring which is fixedly connected to the casing via positioning pins on both ends, and the spring force is provided by the leaf spring.

15. The elevator system according to claim 13, wherein the moving plate is connected to a portion of the stator teeth through a spring, and wherein the portion of the stator teeth is fixedly connected to the casing, and the spring force is provided by the spring.

16. The elevator system according to claim 13, wherein the moving plate has a slit, and when the moving plate is in the second position, it is compressed by the adjacent stator yoke and is elastic deformed to generate a spring force, which drives the moving plate to move toward the first position.

17. The elevator system according to claim 13, wherein at least one friction plate is arranged on a surface of the moving plate that is in contact with the rotor.

18. The elevator system according to claim 12, wherein the moving plate is formed by stacking a plurality of soft magnetic sheets.

19. The elevator system according to claim 12, wherein the stator yoke is formed by a plurality of moving plates circumferentially arranged, and the stator yoke is completely separated from the stator teeth which are fixed to the casing.

20. The elevator system according to claim 12, wherein the rotor comprises an inner ring disposed on an inner side of the stator, an outer ring disposed on an outer side of the stator, and a connection portion connected between the inner ring and the outer ring.

\* \* \* \* \*